United States Patent
Nagai et al.

(10) Patent No.: US 7,474,374 B2
(45) Date of Patent: Jan. 6, 2009

(54) IN-PLANE-SWITCHING-MODE LCD DEVICE HAVING A HIGHER IMAGE QUALITY

(75) Inventors: Hiroshi Nagai, Kanagawa (JP); Hidenori Ikeno, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 711 days.

(21) Appl. No.: 11/018,983

(22) Filed: Dec. 21, 2004

(65) Prior Publication Data

US 2005/0146668 A1 Jul. 7, 2005

(30) Foreign Application Priority Data

Jan. 7, 2004 (JP) ............................. 2004-002298

(51) Int. Cl.
*G02F 1/1343* (2006.01)
(52) U.S. Cl. .................... 349/141; 349/138; 349/43
(58) Field of Classification Search .............. 349/43, 349/138, 141
See application file for complete search history.

(56) References Cited

U.S. PATENT DOCUMENTS 6,504,594 B2 * 1/2003 Ohe et al. ............... 349/141

2003/0107700 A1 6/2003 Ozeki et al. ............. 349/158

FOREIGN PATENT DOCUMENTS

| JP | 54143246 | | 11/1979 |
| JP | 10-307291 | | 11/1998 |
| JP | 10307291 A | * | 11/1998 |
| JP | 201-242462 | | 9/2001 |

* cited by examiner

*Primary Examiner*—David Nelms
*Assistant Examiner*—Phu Vu
(74) *Attorney, Agent, or Firm*—Hayes Soloway P.C.

(57) ABSTRACT

An in-plane-switching-mode (IPS) LCD device includes a TFT substrate and a CF substrate sandwiching therebetween a liquid crystal (LC) layer, and a pair of polarizing films sandwiching therebetween the TFT and CF substrates and LC layer. The TFT substrate includes a SiNx insulation layer having a higher refractive index compared to the TFT substrate and LC layer. The thickness (d) of the SiNx layer is expressed by $d=(100+170\times k)\pm30$ where k is an integer not smaller than zero and not larger than 5. The protective layer of the light-incident-side polarizing film near the insulation film has a thickness larger than zero and not larger than 57 μm.

7 Claims, 3 Drawing Sheets

IN-PLANE-SWITCHING-MODE LCD DEVICE HAVING A HIGHER IMAGE QUALITY

BACKGROUND OF THE INVENTION (a) Field of the Invention

The present invention relates to an IPS (in-plane-switching-mode) LCD (liquid crystal display) device and, more particularly, to suppression of the chromaticity shift between the normal viewing direction and a slanted viewing direction in the IPS LCD device.

(b) Description of the Related Art

An IPS LCD device uses a lateral electric field which rotates the orientations of the LC molecules of the LC layer in the direction parallel to the surfaces of the substrates. The IPS LCD device has the advantage of a wider viewing angle compared to a twisted-nematic-mode LCD device. FIG. 5 shows a typical IPS LCD device in a sectional view thereof.

The IPS LCD device, generally designated by numeral 200, includes a polarizing film 201, a TFT (thin-film-transistor) substrate 202, an LC (liquid crystal) layer 203, a CF (color-filter) substrate 204 and a polarizing film 205, consecutively arranged in the travelling direction of the backlight. In the IPS LCD device 200, an electric field parallel to the substrates 202 and 204 is applied to the LC molecules 210 in the LC layer 203 by a potential difference between a pixel electrode 208 and a counter electrode 209 in each pixel, for driving the LC molecules 210.

In general, although the IPS LCD device 200 has the advantage of the wider viewing angle, as described above, it is known that leakage light is observed upon display of, for example, black, as viewed in a slanted viewing direction from an azimuth angle of 45 degrees with respect to the polarizing axis of the polarizing film 201 or 205. This leakage light causes an undesirable chromaticity shift wherein the original color of black is shifted toward red. The leakage light is generated due to the facts that the angle between the polarizing axes of the polarizing films 201 and 205, which is actually 90 degrees, is observed more than 90 degrees as viewed from the azimuth angle of 45 degrees with respect to the polarizing axis of the polarizing film 201 or 205, that the light passing through the protective layers of the polarizing films 201 and 205 is observed as elliptically polarized light and thus has a retardation, and that the LC layer 203 has a birefringence as viewed in the slanted viewing direction.

FIG. 6 shows the relationship between the viewing angle with respect to the IPS LCD device upon display of black and the chromaticity observed, wherein the chromaticity shift caused by the change of the viewing angle is represented by the shift of the color temperature. The viewing angle is generally defined by an angle between the viewing direction and a normal line of the screen of the LCD device. In general, a color temperature of 1000 K corresponds to red, a color temperature between 2800 K and 3200 K corresponds to orange to yellow, a color temperature between 3200 K and 5000 K corresponds to achromatic or colorless, and a color temperature over 5000 K corresponds to blue.

If the chromaticity observed in the normal viewing direction, i.e., from a viewing angle of zero degree, with respect to the screen upon display of black corresponds to a color temperature of around 11000 K, a slanted viewing angle with respect to the normal line of the screen lowers the color temperature. In particular, the increase of the viewing angle abruptly lowers the color temperature, as shown in FIG. 6. The reduction of the color temperature means an increase of the red component in the light emitted from the LCD device.

The leakage light in a slanted viewing direction as well as the chromaticity shift observed between the normal viewing direction and a slanted viewing direction degrades the image quality of the LCD device, and thus is undesirable. Techniques for reducing the leakage light in the slanted viewing direction and suppressing the chromaticity shift are described in Patent Publications JP-A-10(1998)-307291 and 2001-242462. These techniques use optical compensation layers each having a specific optical characteristic to reduce the leakage light in the slanted viewing direction and suppress the chromaticity shift.

In the typical LCD device 200 shown in FIG. 5, a SiNx (insulation) layer 207 having a refractive index of around 2 is sandwiched between a glass substrate body 206 having a refractive index of 1.54, for example, and an LC layer 203 having a refractive index of around 1.5. In such a case, wherein a layer having a higher refractive index is sandwiched between a pair of layers having a lower refractive index (or refractive indexes), the wavelength characteristic of the transmittance of the light is changed, due to the interference of light, depending on the thickness of the layer sandwiched between the layers having the lower refractive index.

In the case of the LCD device 200, the insulation layer 207 has an apparent thickness (d') as observed in the slanted viewing direction, which is different from the thickness (d) thereof as observed in the normal viewing direction. Due to this apparent difference in the thickness of the insulation layer 207, the insulation layer 207 has a difference in the wavelength characteristic of the transmittance between the slanted viewing direction and the normal viewing direction.

It is assumed here that a 3-wavelength light source having respective peaks in three wavelength ranges corresponding to red, green and blue is used as the backlight source, and that the wavelength characteristic of the transmittance as observed in the normal viewing direction is such that the transmittances of the light components having the wavelengths corresponding to the three peaks are not reduced. In such a case, if the wavelength characteristic of the transmittance in the slanted viewing direction is such that at least one of the peeks in the three wavelength ranges is reduced, then a significant difference arises in the wavelength spectrum between the light transmitted in the slanted viewing direction and the light transmitted in the normal viewing direction. This difference causes a significant chromaticity shift between the slanted viewing direction and the normal viewing direction. In the conventional techniques such as described in the above patent publications, there is no suggestion for determining the thickness of the insulation layer 207 in consideration of the difference of the wavelength characteristic of transmittance between the normal viewing direction and the slanted viewing direction.

In view of the above problems in the conventional techniques, it is an object of the present invention to provide an IPS LCD device which is capable of reducing the leakage light in the slanted viewing direction and suppressing the chromaticity shift between the normal viewing direction and the slanted viewing direction, thereby improving the image quality of the IPS LCD device.

The present invention provides an IPS LCD device including: a liquid crystal (LC) layer having a first refractive index; a light-incident-side substrate and a light-emitting-side substrate sandwiching therebetween the LC layer; and a light-incident-side polarizing film and a light-emitting-side polarizing film sandwiching therebetween the substrates and the LC layer, the light-incident-side substrate including a substrate body having a second refractive index and an insulation layer overlying the substrate body and having a third refractive index which is higher than the first and second refractive indexes, the insulation layer having a thickness (d nm) substantially satisfying the following relationship:

$$d = (100 + 170 \times k) \pm 30$$

where k is an integer not smaller than zero and not larger than 5.

In accordance with the IPS LCD device of the present invention, the thickness of the insulation layer satisfying the above relationship allows reduction of the leakage light in a slanted viewing direction and suppression of the chromaticity shift between the normal viewing direction (frontal viewing direction) and the slanted viewing direction.

The inventors conducted simulations wherein the wavelength characteristic of the transmittance was controlled in the normal viewing direction and the slanted viewing direction by setting the thickness of the insulation layer, to obtain a suitable range of the thickness of the insulation layer.

It is to be noted that if the insulation layer includes a plurality of films stacked one on another, the total thickness of the layered films should satisfy the above relationship. The insulation layer may be a SiNx film having a refractive index of around 1.8 to 2.0. Another layer may be interposed between the insulation layer and the substrate body so long as the another layer has a refractive index substantially same as the refractive index of the substrate body.

The above and other objects, features and advantages of the present invention will be more apparent from the following description, referring to the accompanying drawings.

PREFERRED EMBODIMENT OF THE INVENTION

Figure 1:
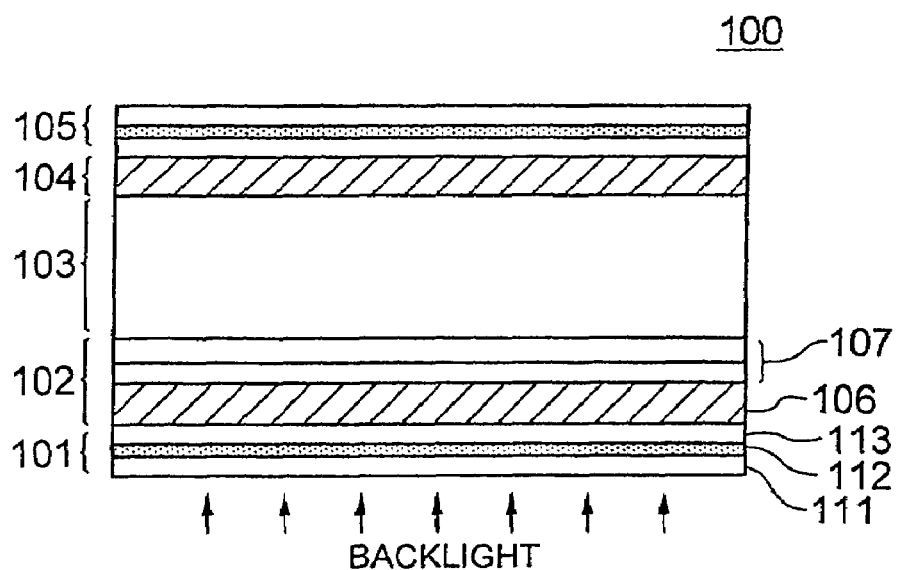
FIG. 1 is a sectional view of an LCD device according to an embodiment of the present invention.

Now, the present invention is more specifically described with reference to accompanying drawings, wherein similar constituent elements are designated by similar reference numerals.

Referring to FIG. 1, an IPS LCD device, generally designated by numeral 100, according to an embodiment of the present invention includes a polarizing film 101, a TFT (thin-film-transistor) substrate 102, an LC layer 103, a CF (color-filter) substrate 104 and a polarizing film 105, which are arranged in this order as viewed along the travelling direction of the backlight. The light-incident-side polarizing film 101 and the light-emitting-side polarizing film 105 are disposed so that the polarizing axes of these polarizing films 101 and 105 extend perpendicular to each other.

Polarizing film 101 includes a first protective layer 111, a polarizing layer 112, and a second protective layer 113, which are consecutively layered one on another as viewed along the travelling direction of the backlight. Each of the first and second protective layers 111 and 113 is made of TAC (tri-acetyl-cellulose), has an optical axis in the thickness direction thereof, and has a birefringence depending on the thickness thereof. The TFT substrate 102 includes a glass substrate body 106, and an insulation layer 107 made of SiNx overlying the glass substrate body 106. The insulation layer 107 includes, for example, a gate insulation layer of a TFT and an interlayer dielectric layer of the TFT, both not specifically shown in the figure.

For example, the insulation layer 107 has a refractive index of 1.85 to 2.0, the glass substrate body 106 has a refractive index of 1.54, and the LC layer 103 has a refractive index of 1.45 to 1.55. The insulation layer 107 is sandwiched between the glass substrate body 106 and the LC layer 103, which have lower refractive indexes compared to the insulation layer 107, whereby the wavelength characteristic of the transmittance of the insulation layer 107 changes depending on the thickness thereof. Since the insulation layer 107 in the LCD device 100 has an apparent thickness in a slanted viewing direction, which is different from the thickness thereof in the normal viewing direction, the insulation layer 107 has a wavelength characteristic of the transmittance in the slanted viewing direction, which is different from the wavelength characteristic of the transmittance in the normal direction.

It is noted that the LCD device 100 emits light having wavelengths corresponding to RGB primary colors determined by the color filters on the CF substrate 104. Thus, it is considered that the shift of the color temperature may be suppressed if there is only a small difference in the transmittance between the normal viewing direction and the slanted viewing direction in each of the wavelength ranges corresponding to the three primary colors. This suppression of the shift of the color temperature may be possible irrespective of whether or not the wavelength characteristic of the transmittance of the insulation layer 107 differs between the normal viewing direction and the slanted viewing direction.

Figure 6:
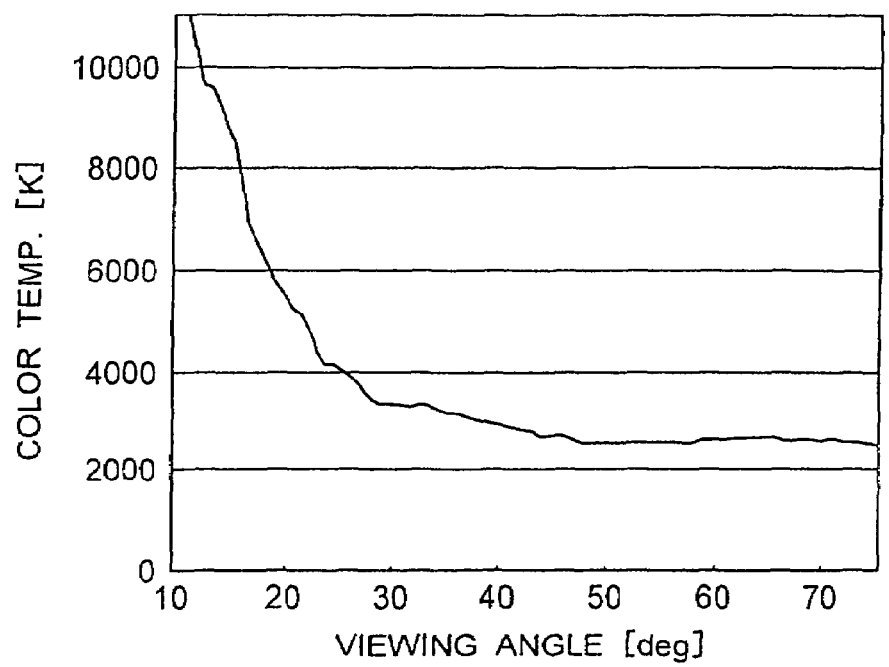
FIG. 6 is a graph showing the relationship between the viewing angle and the chromaticity upon display of black on the LCD device of FIG. 5.

The inventors conducted simulations for the purpose of examining the relationship between the thickness of the insulation layer 107 and the color temperature observed in the slanted viewing direction, while changing the thickness of the insulation layer 107. By the simulations, the range of the thickness of the insulation layer 107 was found which achieves a smaller difference in the color temperature between the normal viewing direction and the slanted viewing direction. In the conditions of the simulations, an angle of 45 degrees with respect to the polarizing axis of the polarizing film 101 or 105 was employed as the azimuth angle of the slanted viewing direction. In addition, an angle of 40 degrees was employed as the slanted viewing angle with respect to the normal line of the screen of the LCD device, because the reduction of the color temperature substantially converges at the slanted viewing angle of 40 degrees, as shown in FIG. 6.

Figure 2:
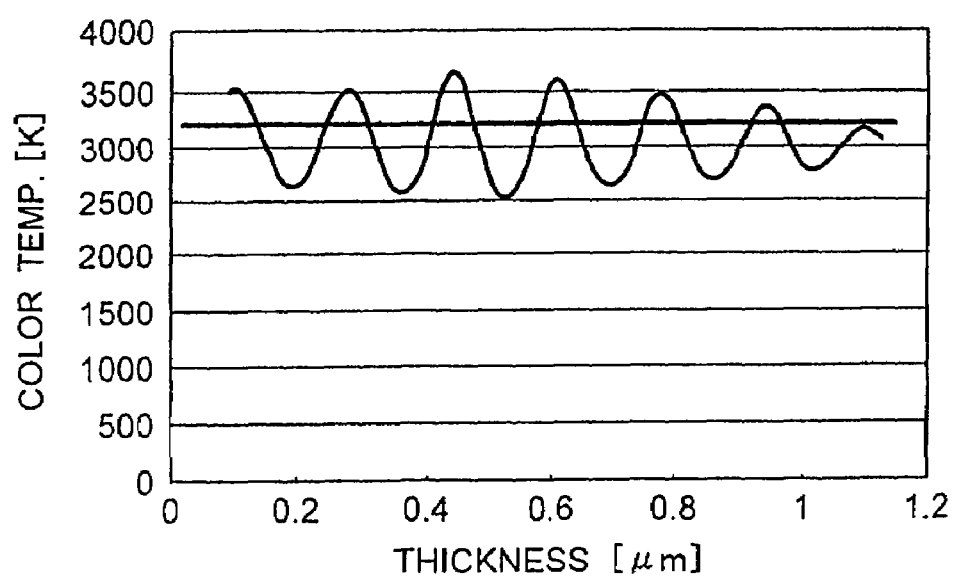
FIG. 2 is a graph showing the relationship obtained by simulations between the thickness of the insulation layer and the color temperature observed in the slanted viewing direction upon display of black on the LCD device.

FIG. 2 shows the relationship obtained by the simulations between the thickness of the insulation layer 107 and the color temperature in the slanted viewing direction upon display of black. Other conditions employed in the simulations were such that the refractive indexes of the glass substrate body 106, the insulation layer 107 and the LC layer 103 were 1.54, 1.87 and 1.45 to 1.55, respectively. The refractive indexes thus employed correspond to the refractive indexes against the light having a wavelength of 550 nm, which is the central wavelength of the visible light. In addition, the thickness of the second protective layer 113 of the polarizing film 101 was fixed at 80 μm, and the color temperature observed in the normal viewing direction was set at 14000 K to 15000 K. As shown in FIG. 2, the color temperature observed in the slanted viewing direction periodically changes between about 2500 K and about 3600 K along with the change of the thickness of the insulation layer 107.

From the result of the simulations shown in FIG. 2, the thickness of the insulation layer 107, which provides a color temperature of 3200 K or above, can be obtained. The 3200 K was employed because this color temperature corresponds to achromatic. The thickness "d" of the insulation layer 107 thus obtained is expressed by the following formula:

$$d = (100 + 170 \times k) \pm 30 \quad (1)$$

where k=0, 1, 2, 3, 4 and 5.

In other words, the ranges of the thickness "d" of the insulation layer 107 satisfying the formula (1) suppress the shift of the color temperature, thereby suppressing the chromaticity shift between the normal viewing direction and the slanted viewing direction.

It was noted that the chromaticity shift observed or perceived might depend on the sense of the viewer itself as well as the environment of the LCD device. Thus, an experiment was conducted for finding the degree of the shift of the color temperature in the slanted viewing direction from the color temperature observed in the normal viewing angle. This experiment was conducted under the environment of fluorescent light for the case of a color temperature of 14000 K to 15000 K in the normal viewing direction. It was found from the experiment that the viewer did not find any chromaticity shift between the normal viewing direction and the slanted viewing direction so long as the color temperature observed in the slanted viewing direction exceeded 5000k. This result revealed that the thickness of the insulation layer 107 satisfying the formula (1) could not reduce the color temperature down to a desirable degree that the viewer did not perceive any reduction of the color temperature, although it significantly suppressed the chromaticity shift.

The leakage light in the slanted viewing direction is caused also by the retardation generated in the second protective layer 113 of the light-incident-side polarizing film 101. Therefore, it was considered that suppression of the retardation in the second protective layer 113 having a birefringence was also effective for the suppression of reduction of the color temperature. More specifically, there was an expectation that there might be a thickness of the second protective layer 113 that maintains the color temperature in the slanted viewing direction not lower than 5000 K, i.e., at the level that the viewer does not perceive any chromaticity shift. Thus, next simulations were conducted in order for obtaining the relationship between the thickness of the second protective layer 113 and the color temperature in the slanted viewing direction.

Figure 3:
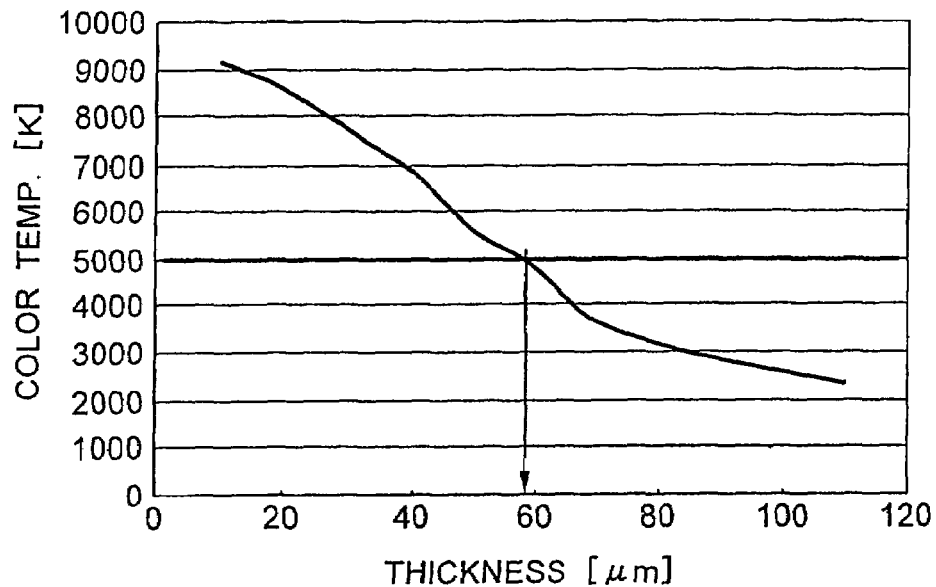
FIG. 3 is another graph showing the relationship obtained by simulations between the thickness of the protective layer of the polarizing film and the color temperature observed in the slanted viewing direction upon display of black on the LCD device.

FIG. 3 shows the result of the next simulations as described above. In these simulations, the refractive indexes were similar to those employed in the simulations that provided the graph of FIG. 2. The thickness of the insulation layer 107 was fixed at 580 nm as a typical example that provided a color temperature of 3200 K in FIG. 2. In the results of the simulations shown in FIG. 2, a smaller thickness of the second protective layer 113, i.e., a smaller retardation of the second protective layer 113, provided a higher color temperature in the slanted viewing direction upon display of black.

From the results of the simulations shown in FIG. 3, the thickness "t" of the second protective layer 113 which provides a color temperature of 5000 K or above in the slanted viewing direction is obtained as follows:

$$0 \ \mu m < t \leq 57 \ \mu m \quad (2).$$

The thickness, 57 μm, of the second protective layer 113 corresponds to an in-plane retardation of 4.5 nm and an orthogonal retardation (retardation in the thickness direction) of 45 nm of the second protective layer 113. In other words, the formula (2) is equivalent to the following formulas:

$$0 \ nm < N1 \leq 4.5 \ nm; \text{ and}$$

$$0 \ nm < \Delta nd \leq 45 \quad (3),$$

where N1 and Δnd are the in-plane retardation and the orthogonal retardation, respectively, of the second protective layer 113.

In the configurations of the present embodiment, the thickness of the insulation layer 107 satisfying the formula (1) provides suppression of the reduction of the color temperature, thereby significantly reducing the chromaticity shift between the normal viewing direction and the slanted viewing direction. On the other hand, the thickness of the second protective layer 113 of the light-incident-side polarizing film 101 satisfying the formula (2) in the configurations assists the suppression of the reduction of the color temperature to maintain the color temperature at 5000 K or above. This combination of the insulation layer 107 and the second protective layer 113 provides a higher image quality for the LCD device.

Another layer having a lower refractive index may be interposed between the insulation layer 107 and the LC layer 103 or between the insulation layer 107 and the glass substrate body 106 in the present invention.

Figure 4:
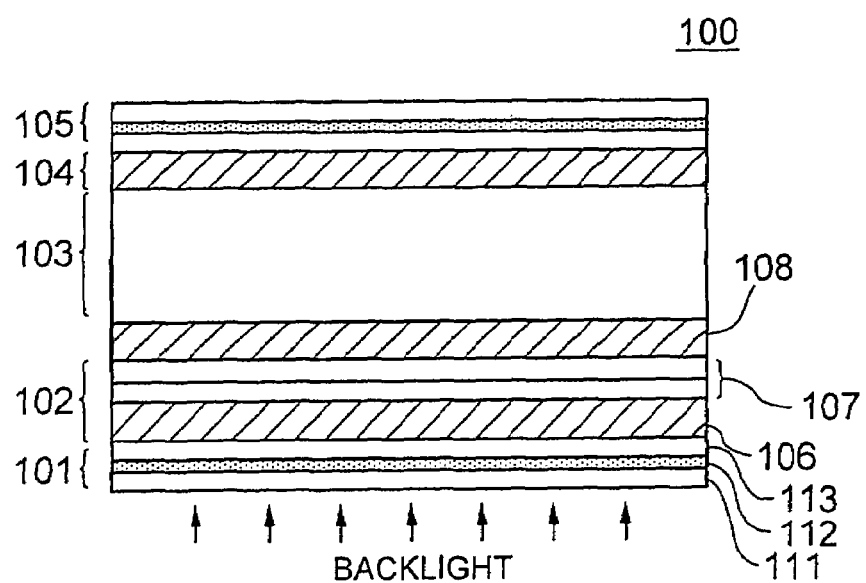
FIG. 4 is a sectional view of an LCD device according to a modification from the LCD device of FIG. 1.
Figure 5:
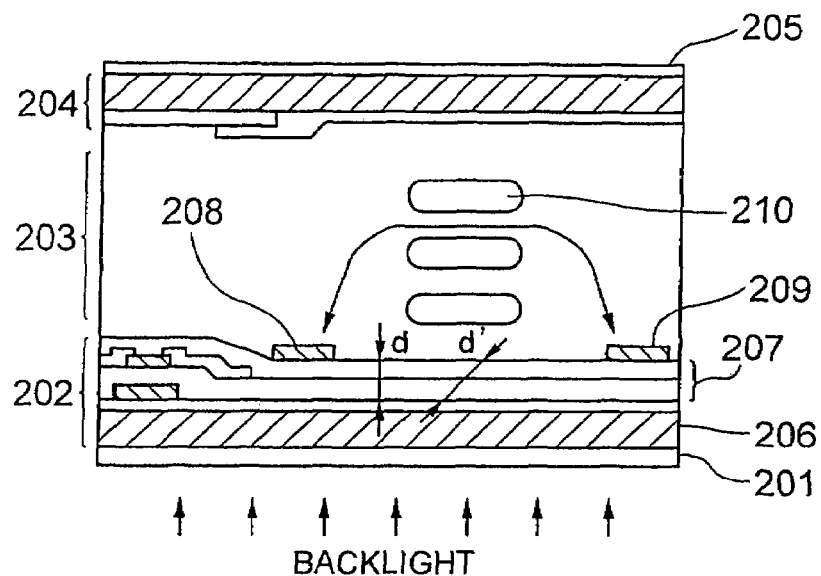
FIG. 5 is a sectional view of a typical IPS LCD device.

For example, as shown in FIG. 4 depicting a modification from the LCD device of FIG. 1, the insulation layer 107 may be sandwiched between a pair of glass substrate bodies 106 and 108 having a lower refractive index or lower refractive indexes compared to the refractive index of the insulation layer 107. In this case, the thickness of the insulation layer 107 should satisfy the formula (1), whereas the second protective layer 113 of the light-incident-side polarizing film 101 should satisfy the formula (2) for achieving a similar advantage.

It is to be noted that if a film sandwiched between a pair of layers having a lower refractive index or lower refractive indexes includes a plurality of layers having a higher refractive index or higher refractive indexes, the total thickness of the plurality of layers should satisfy the formula (1) for achieving the advantage.

Since the above embodiments are described only for examples, the present invention is not limited to the above embodiments and various modifications or alterations can be easily made therefrom by those skilled in the art without departing from the scope of the present invention.

What is claimed is:

1. An in-plane-switching-mode liquid crystal display (IPS LCD) device comprising:
   a liquid crystal (LC) layer having a first refractive index;
   a light-incident-side substrate and a light-emitting-side substrate sandwiching therebetween said LC layer; and
   a light-incident-side polarizing film and a light-emitting-side polarizing film sandwiching therebetween said substrates and said LC layer,
   said light-incident-side substrate including a substrate body having a second refractive index and an insulation layer overlying said substrate body and having a third refractive index which is higher than said first and second refractive indexes, said insulation layer having a thickness (d nm) substantially satisfying the following relationship:

$$d = (100 + 170 \times k) \pm 30$$

where k is an integer not smaller than zero and not larger than 5.

2. The IPS LCD device according to claim 1, wherein said insulation layer is an SiNx layer.

3. The IPS LCD device according to claim 1, wherein said light-incident-side substrate further includes another layer interposed between said insulation layer and said substrate body and having a fourth refractive index lower than said third refractive index.

4. The IPS LCD device according to claim 1, wherein said light-incident-side substrate further includes another layer interposed between said insulation layer and said LC layer and having a fourth refractive index lower than said third refractive index.

5. The IPS LCD device according to claim 4, wherein said fourth refractive index is substantially equal to said first refractive index.

6. The IPS LCD device according to claim 1, wherein:
said light-incident-side polarizing film includes a first protective layer, a polarizing layer and a second protective layer which are consecutively disposed from a light incident side of said LCD device; and
said second protective layer has a thickness (t μm), an optical axis in a thickness direction thereof, and a birefringence depending on the thickness thereof, and the thickness of said second protective layer satisfies the following relationship:

$$0 < t \leq 57.$$

7. The IPS LCD device according to claim 1, wherein:
said light-incident-side polarizing film includes a first protective layer, a polarizing layer and a second protective layer which are consecutively disposed from a light incident side of the LCD device; and
said second protective layer has an optical axis in a thickness direction thereof and a birefringence depending on a thickness of thereof, said birefringence being such that an in-plane retardation is larger than zero and not larger than 4.5 nm and an orthogonal retardation is larger than zero and not larger than 45 nm.

* * * * *